(12) United States Patent
Sawatzki et al.

(10) Patent No.: US 12,460,665 B2
(45) Date of Patent: Nov. 4, 2025

(54) DOUBLING-UP FITTING AND ASSEMBLY HAVING TWO DOUBLED-UP PLATES

(71) Applicant: Häfele Berlin GmbH & Co KG, Berlin (DE)

(72) Inventors: Gerd Sawatzki, Datteln (DE); Ulrich Merz, Regensburg (DE)

(73) Assignee: Häfele Berlin GmbH & Co KG, Berlin (DE)

( * ) Notice: Subject to any disclaimer, the term of this patent is extended or adjusted under 35 U.S.C. 154(b) by 332 days.

(21) Appl. No.: 18/297,168

(22) Filed: Apr. 7, 2023

(65) Prior Publication Data

US 2023/0243373 A1 Aug. 3, 2023

Related U.S. Application Data

(63) Continuation of application No. PCT/EP2021/076765, filed on Sep. 29, 2021.

(30) Foreign Application Priority Data

Nov. 4, 2020 (DE) ...................... 20 2020 106 305.7

(51) Int. Cl.
*F16B 5/02* (2006.01)
*A47B 88/95* (2017.01)
(Continued)

(52) U.S. Cl.
CPC ............ *F16B 5/0225* (2013.01); *A47B 88/95* (2017.01); *F16B 2/18* (2013.01); *F16B 12/2027* (2013.01)

(58) Field of Classification Search
CPC . A47B 88/95; A47B 88/956; A47B 2088/951; A47B 2088/952;
(Continued)

(56) References Cited

U.S. PATENT DOCUMENTS 2,877,818 A * 3/1959 Johnson .............. F16B 13/0833
411/347
3,088,178 A * 5/1963 Propst ................. F16B 12/2027
403/297
(Continued)

FOREIGN PATENT DOCUMENTS

DE 10 2014 115 186 B3 2/2016
DE 10 2017 113 566 A1 12/2018
(Continued)

*Primary Examiner* — Josh Skroupa
(74) *Attorney, Agent, or Firm* — Orbit IP, LLP; Marc G. Martino

(57) ABSTRACT

A doubling-up fitting includes a clamp element with a clamp base and at least two clamp arms rising from the clamp base at its ends. The free clamp ends are angled inward and extend over the clamp base. A rotatably mounted spreading disc is arranged between the clamp base and the free clamp ends. A disc opening leads into a recess in the spreading disc where the diameter is greater than the disc opening diameter. A plurality of outer contour portions spread the free clamp ends radially outward less far in an initial rotational position of the spreading disc than in a final rotational position. An adjusting disc arranged in the recess of the spreading disc has a thread. The outer diameter of the adjusting disc is smaller than the diameter of the recess in the spreading disc and larger than the opening diameter of the disc opening.

13 Claims, 3 Drawing Sheets

(51) Int. Cl.
*F16B 2/18* (2006.01)
*F16B 12/20* (2006.01)

(58) Field of Classification Search
CPC ........ A47B 2088/954; A47B 2096/208; A47B 2230/0022; A47B 2230/0025; A47B 2230/0044; A47B 2230/0048; A47B 2230/11; F16B 2/04; F16B 2/18; F16B 2/243; F16B 5/0084; F16B 5/0088; F16B 5/02; F16B 5/0216; F16B 5/0225; F16B 7/1427; F16B 12/2009; F16B 12/2027; F16B 12/2054; F16B 12/2063; F16B 13/04; F16B 13/0833; F16B 21/02; Y10S 403/10; Y10S 403/12; Y10S 403/13; Y10T 403/60; Y10T 403/608; Y10T 403/7005; Y10T 403/7009; Y10T 403/7011; Y10T 403/7013; Y10T 403/7015; Y10T 403/7056; Y10T 403/7067; Y10T 403/7069
USPC ....... 403/326, 330, 348, 350, 351, 352, 353, 403/370, 374.3, 374.4, DIG. 10, DIG. 12, 403/DIG. 13
See application file for complete search history.

(56) References Cited

U.S. PATENT DOCUMENTS

| | | | | |
|---|---|---|---|---|
| 3,515,418 | A * | 6/1970 | Nielsen, Jr. | A61B 5/021 403/352 |
| 3,766,636 | A * | 10/1973 | Sygnator | F16B 5/0225 29/525.02 |
| 4,494,670 | A * | 1/1985 | Barone | F16B 2/04 220/235 |
| 4,782,845 | A * | 11/1988 | Chou | F16B 7/1427 248/354.3 |
| 5,158,409 | A * | 10/1992 | Ishida | F16B 2/18 411/150 |
| 6,203,128 | B1 * | 3/2001 | Koziol | F16B 12/2063 312/9.48 |
| 6,619,877 | B1 * | 9/2003 | Huang | F16B 7/1427 403/350 |
| 6,874,393 | B2 * | 4/2005 | Kile | B25B 13/5083 81/442 |
| 7,537,409 | B2 | 5/2009 | Huhnerbein | |
| 9,631,657 | B2 | 4/2017 | Zajak et al. | |
| 9,939,001 | B2 * | 4/2018 | Deman | F16B 12/2009 |
| 10,436,235 | B2 * | 10/2019 | Daniels | F16B 7/1427 |

FOREIGN PATENT DOCUMENTS

| | | | | |
|---|---|---|---|---|
| EP | 0594468 A1 * | 4/1994 | | F16B 2/04 |
| GB | 190019835 A * | 6/1901 | | F16B 2/04 |
| WO | 2006/042564 A1 | 4/2006 | | |
| WO | 2018/233922 A1 | 12/2018 | | |

\* cited by examiner

US 12,460,665 B2

DOUBLING-UP FITTING AND ASSEMBLY HAVING TWO DOUBLED-UP PLATES

CROSS-REFERENCE TO RELATED APPLICATIONS

This continuation application claims priority to PCT/EP2021/076765 filed on Sep. 29, 2021 which has published as WO 2022/096199 A1 and also the German application number 20 2020 106 305.7 filed on Nov. 4, 2020, the entire contents of which are fully incorporated herein with these references.

DESCRIPTION

Field of the Invention

The invention relates to a doubling-up fitting for adjusting and fixing of two plates lying on one another (doubled-up), in particular furniture plates, e.g., drawer fronts, side covers or cover panels.

Background of the Invention

Doubling-up fittings serve for example for fixing a front plate to the remaining body of the furniture, e.g., a flap fixing on the furniture body, and are usually screwed to the furniture body by means of threaded bolts. Here, an annular fitting housing, behind which the bolt head of the threaded bolt engages, is tapped into a blind bore of the front plate by an impact tool (e.g., hammer). A sleeved nut is placed in a passage bore in the furniture body and screwed to the threaded bolt. The greater clear opening diameter of the fitting housing compared with the bolt diameter allows a two-dimensional adjustment, of e.g., ±2 mm, of the contacting front plate relative to the furniture body. After adjustment, the sleeved nut is tightened until the front plate lies firmly on the furniture body. In this known doubling-up fittings, the fitting housing cannot be inserted manually into the blind bore but must be tapped with a tool in order to anchor the fitting housing firmly in the blind bore.

SUMMARY OF THE INVENTION

In this context, the invention is based on the object of providing a doubling-up fitting which can be installed easily and simply without an impact tool.

According to the invention, this object is achieved by a doubling-up fitting which comprises: a clamp element with a clamp base and at least two clamp arms which rise from the clamp base at its respective ends, the free clamp ends of which are angled inward and extend over the clamp base; a rotatably mounted spreading disc arranged in the clamp element between the clamp base and the free clamp ends, with a disc opening leading into a recess in the spreading disc which is open toward the clamp base and the diameter of which is greater than the opening diameter of the disc opening, and with a plurality of outer contour portions which each interact with a respective clamp arm and spread the free clamp ends radially outward less far in an initial rotational position of the spreading disc than in a final rotational position; and an adjusting disc arranged in the recess of the spreading disc and having a thread; wherein the outer diameter of the adjusting disc is smaller than the diameter of the recess in the spreading disc and larger than the opening diameter of the disc opening.

The doubling-up fitting according to the invention allows doubled-up plates lying on top of one another, such as e.g., drawer fronts, side covers or cover panels, to be adjusted in two dimensions and fixed in the respective adjusted position. The doubling-up fitting can be inserted by hand, i.e., without tools, in a bore in one of the two plates and anchored therein in that the clamping arms are spread apart by rotating the clamping disc.

Preferably, the free clamp ends have at least one radially outwardly extending protrusion which can press or cut into a bore wall.

Particularly preferably, the free clamp ends each have a base portion and, on one or both sides, a side arm adjoining this in a rotation direction of the spreading disc and extending in the rotation direction of the spreading disc and being deflected radially outward by the outer contour portions of the spreading disc.

The adjusting disc may advantageously be configured as a stepped disc with two diameters, wherein the disc part with the smaller outer diameter is arranged inside the disc opening of the spreading disc, and the smaller outer diameter is smaller than the opening diameter of the disc opening of the spreading disc.

Preferably, the adjusting disc has a centering pin which engages in a hole of the clamp base in order to lock the adjusting disc on the clamp element and thus, on later component installation, facilitate finding of the thread of the adjusting disc.

In a preferred embodiment, for each clamp arm, the outer edge of the spreading disc has at least one radially inwardly set back latching cutout in which the clamp arm latches in the final rotational position of the spreading disc. The latching excludes an unintended return to the initial rotational position.

Preferably, in each case three contour portions and two spreading arms are present, in order to achieve a spreading of the two side arms by a respective two of the contour portions in both rotational directions of the spreading disc.

As a handle for manual rotating of the spreading disc, the top side of the spreading disc may have at least two finger depressions.

Particularly preferably, the clamp element is performed by bending a cut metal plate.

In a further aspect, the invention also relates to an assembly with two plates lying on one another, in particular two furniture plates, and with a doubling-up fitting as described above, wherein the doubling-up fitting, with the clamp base ahead, is inserted in a bore, in particular a blind bore, in the one first plate and, by rotating of the spreading disc from the initial into the final rotational position, the clamping arms are spread radially outward against the wall of the blind bore of the first plate, and wherein a screw extends through a bore in the other second plate and is screwed to the thread of the adjusting disc.

Further advantages of the invention arise from the description, the claims and the drawing. Also, the above-mentioned features and those listed below may be used alone or together in any combination. The embodiment shown and described should not be regarded as a definitive list, but rather has an exemplary character for illustration of the invention.

DETAILED DESCRIPTION OF THE PREFERRED EMBODIMENTS

The doubling-up fitting 1 shown in FIGS. 1a-1c and FIG. 2 serves for two-dimensionally adjusting and fixing of two doubled-up furniture plates, e.g., drawer fronts, side covers or cover panels.

Figure 1A:
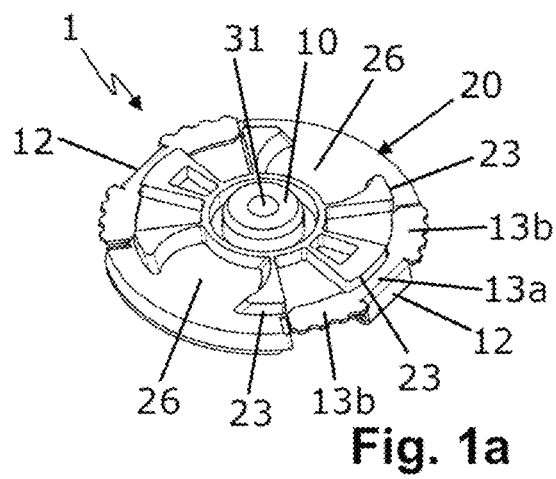
FIGS. 1a-1c illustrate a view from above of the doubling-up fitting according to the invention in an initial rotational position (FIG. 1a) and in a final rotational position (FIG. 1b), and in a view from below (FIG. 1c) in an initial rotational position.
Figure 1B:
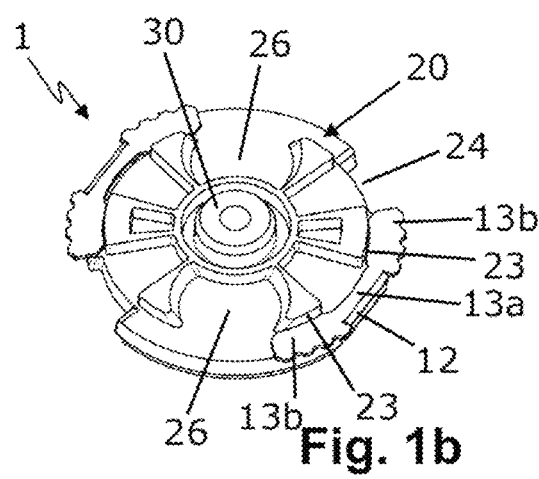

The doubling-up fitting 1 has the following individual components: a clamp element 10 with a clamp base 11 and two clamp arms 12 which rise from the clamp base 11 at its respective ends, the free clamp ends of which are angled inward and extend over the clamp base 11; a rotatably mounted spreading disc 20 arranged in the clamp element 10 between the clamp base 11 and the free clamp ends, with a disc opening 21 leading into a recess 22 in the spreading disc 20 which is open toward the clamp base 11 and the diameter D2 of which is greater than the opening diameter D1 of the disc opening 21, the spreading disc having a plurality (here three) of outer contour portions 23 which each interact with a clamp arm 12 and spread the free clamp ends radially outward less far in the initial rotational position of the spreading disc 20 shown in FIG. 1a than in the final rotational position shown in FIG. 1b; and an adjusting disc 30 which is arranged in the recess 22 of the spreading disc 20 and has an e.g., centrally arranged internal thread 31.

The adjusting disc 30 may be configured as a simple disc with outer diameter d1 or as shown in the exemplary embodiment, as a stepped disc with outer diameters d1, d2. The disc part with the smaller outer diameter d2 is arranged in the disc opening 21 of the spreading disc 20 and has the internal thread 31. The larger outer diameter d1 of the adjusting disc 30 is e.g., 4 mm smaller than the diameter D2 of the recess 22 of the spreading disc 20, and the smaller outer diameter d2 is also correspond-ingly smaller than the disc opening 21, whereby the adjusting disc 30 is mounted inside the recess 22 so as to be adjustable in two dimensions, in the above exemplary embodiment by ±2 mm. The outer diameter d1 of the adjusting disc 30 is larger than the opening diameter D1 of the disc opening 21, whereby the adjusting disc 30 engages behind the spreading disc 20, viewed in a direction away from the clamp base 11 towards the adjusting disc 30.

The free clamp ends each have a middle base portion 13a adjoined on each side by ring-segment-shaped side arms 13b which each extend in one of the two rotational directions of the spreading disc 20. The base portion 13a and the two side arms 13b extend radially inward in order to extend over the clamp base 11. The radially inwardly pointing inner edge of the middle base portion 13a is radially outwardly set back relative to the radially inwardly pointing inner edges of the side arms 13b, in order to form a recess 14. The radially outwardly pointing outer edges of the two side arms 13b are provided with blade-shaped protrusions 15. Optionally, a central hole 16 may be provided in the clamp base 11 for a centering pin 32 of the adjusting disc 30. The clamp element 10 is preferably formed by bending a cut metal plate.

For each clamping arm 12, the outer edge of the spreading disc 20 has two latching cutouts 24 which are set back radially inwardly, and in between an edge portion 25 which is not set back radially inwardly. The spreading disc 20 can be rotated in both directions relative to the clamp element 10 via two finger depressions 26 on the top side.

Figure 1C:
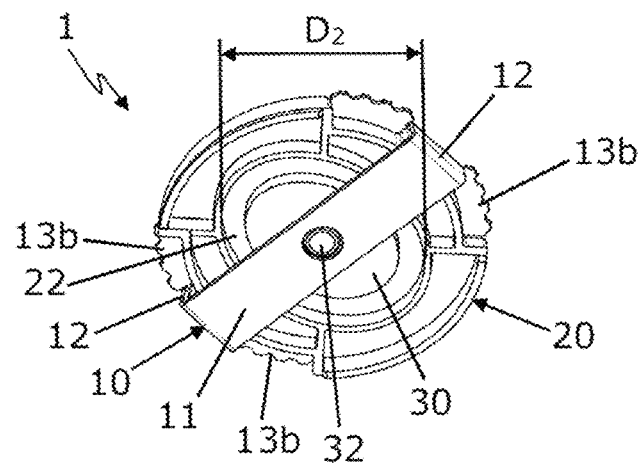
Figure 2:
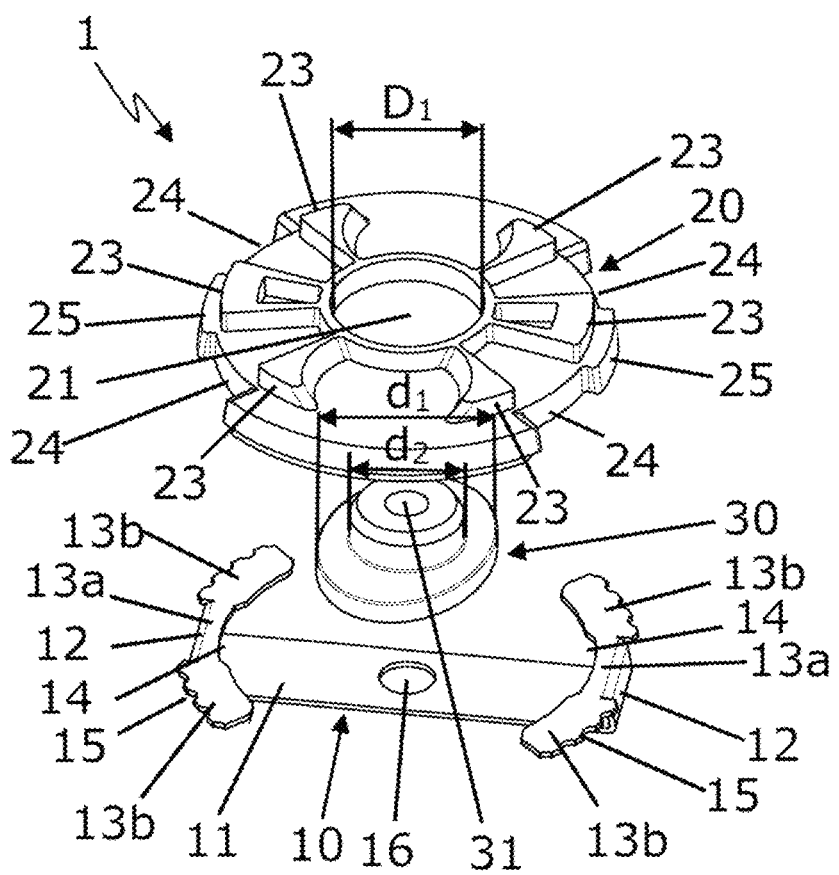
FIG. 2 illustrates an exploded view of the doubling-up fitting according to the invention.

In the initial rotational position of the doubling-up fitting 1 shown in FIGS. 1a and 1c, on one side the two clamping arms 12 bear against the edge portions 25 of the spreading disc 20—each against the effect of a radially inwardly pointing elastic return force—and on the other side, the middle base portions 13a of the clamp ends each lie with their inner edge against the edge portions 25.

By rotating the spreading disc 20 in one of the two rotational directions (by rotating counterclockwise in FIG. 1b), the doubling-up fitting 1 is rotated into the final rotational position shown in FIG. 1b. In this final rotational position, firstly the two clamp arms 12 are latched radially inwardly—under the effect of the return force—in the respective latching cutouts 24 of the spreading disc 20, and secondly the side arms 13b of the clamping arms 12 are deflected radially outwardly by the middle and one of the two outer contour portions 23.

Instead of the internal thread 31 shown, the adjusting disc 30 may alterna-tively also have an external thread. Thus, in the case of a stepped disc, for example the disc part with the smaller outer diameter d2 may have an external thread.

Instead of being formed in three pieces as shown, the doubling-up fitting 1 may also be formed in two pieces if the spreading and adjusting discs 20, 30 are initially produced as a common injection molding with one or more nominal break points, which are then broken during mounting by movement of the adjusting disc 30 relative to the spreading disc 20.

Figure 3:
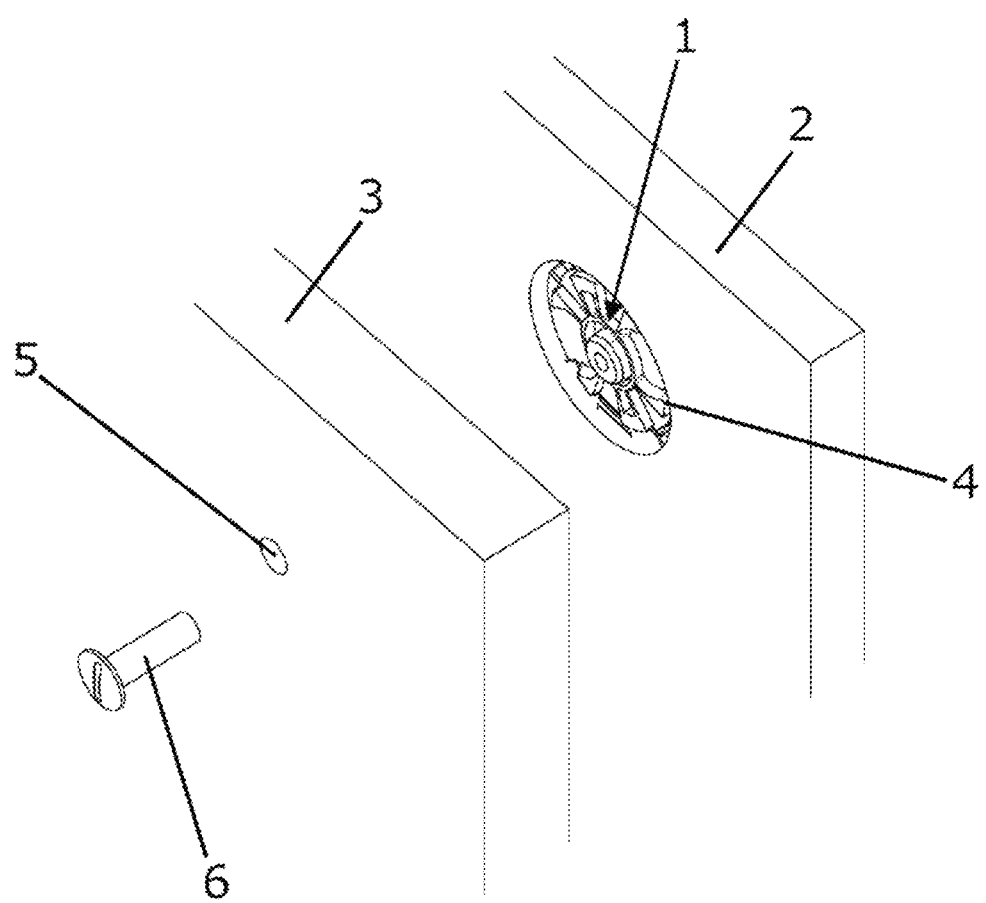
FIG. 3 illustrates an assembly according to the invention with two doubled-up furniture plates adjusted by means of the doubling-up fitting.

FIG. 3 shows an assembly with two furniture plates 2, 3 lying on one another (doubled-up), adjusted and fixed by means of the doubling-up fitting 1. A blind bore 4 with a bore diameter corresponding to the doubling-up fitting 1 (e.g., 30 mm) is drilled in the outer furniture plate 2 (e.g., made of wood), and a (through) bore 5 for a screw 6 is drilled in the inner furniture plate 3.

The doubling-up fitting 1 in the initial rotational position is inserted, with the clamp base 11 ahead, into the blind bore 4 of the outer plate 2, whereby the clamp element 10 is already pre-fixed rotationally fixedly in the blind bore 4 by its protrusions 15. In this initial rotational position, the adjusting disc 30 is locked by the centering pin 32 centrally on the clamp element 8, in order, on later component installation, to facilitate finding of the hole of the internal thread 31.

By manually rotating the spreading disc 20 from the initial into the final rotational position, the side arms 13b of the clamp element 10, as described above, are spread radially outward and hence the protrusions 15 are pressed into the wall of the blind bore 4, whereby the doubling-up fitting 1 is fixedly anchored in the blind bore 4. The screw 6 extending through the bore 5 of the inner plate 3 is screwed into the internal thread 31 of the adjusting disc 30 until the plates 2, 3 lying on one another are clamped tightly together by means of the adjusting disc 30, which engages behind the spreading disc 20 anchored in the outer plate 2 in the tension direction of the screw 5, and hence pulls the outer plate 2 against the inner plate 3. The centering pin 32 is thus lifted out of the hole 16 of the clamping base 11 and hence the lock of the adjusting disc 30 is released.

Before final tightening of the two plates 2, 3, the outer diameter d1 of the adjusting disc 30, which is smaller than the diameter D2 of the recess 22 of the spreading disc 20, allows a two-dimensional adjustment of the mutually contacting furniture plates 2, 3 of e.g., ±2 mm. After final tightening, the adjusted doubled-up furniture plates 2, 3 are fixedly connected together.

What is claimed is:

1. A doubling-up fitting, comprising:
   a clamp element with a clamp base and at least two clamp arms which rise from the clamp base at its respective ends, the free clamp ends of which are angled inward and extend over the clamp base;
   a rotatably mounted spreading disc arranged in the clamp element between the clamp base and the free clamp ends, with a disc opening leading into a recess in the spreading disc which is open toward the clamp base and the diameter of which is greater than the opening diameter of the disc opening, and with a plurality of outer contour portions which each interact with a respective clamp arm and spread the free clamp ends radially outward less far in an initial rotational position of the spreading disc than in a final rotational position; and
   an adjusting disc arranged in the recess of the spreading disc and having a thread;
   wherein the outer diameter of the adjusting disc is smaller than the diameter of the recess in the spreading disc and larger than the opening diameter of the disc opening.

2. The doubling-up fitting as claimed in claim 1, wherein the free clamp ends have at least one radially outwardly extending protrusion.

3. The doubling-up fitting as claimed in claim 2, wherein the free clamp ends each have a base portion and, on one or both sides, a side arm adjoining this in a rotation direction of the spreading disc and extending in the rotation direction of the spreading disc.

4. The doubling-up fitting as claimed in claim 1, wherein the free clamp ends each have a base portion and, on one or both sides, a side arm adjoining this in a rotation direction of the spreading disc and extending in the rotation direction of the spreading disc.

5. The doubling-up fitting as claimed in claim 1, wherein the adjusting disc is configured as a stepped disc with two diameters, wherein the disc part with the smaller outer diameter is arranged inside the disc opening of the spreading disc, and the smaller outer diameter is smaller than the opening diameter of the disc opening of the spreading disc.

6. The doubling-up fitting as claimed in claim 1, wherein the adjusting disc has a centering pin which engages in a hole of the clamp base.

7. The doubling-up fitting as claimed in claim 1, wherein for each clamp arm, the outer edge of the spreading disc has at least one radially inwardly set back latching cutout in which the clamp arm latches in the final rotational position of the spreading disc.

8. The doubling-up fitting as claimed in claim 4, wherein at each free clamp end three contour portions of the plurality contour portions and two side arms cooperate in order to achieve a spreading of the two side arms at each free clamp end by two of the contour portions in both rotational directions of the spreading disc.

9. The doubling-up fitting as claimed in claim 1, wherein the top side of the spreading disc has at least two finger depressions.

10. The doubling-up fitting as claimed in claim 1, wherein the clamp element is a bent cut metal plate.

11. An assembly comprising:
    a first and a second plate lying on one another and with the doubling-up fitting as claimed in claim 1;
    wherein the doubling-up fitting with the clamp base ahead is inserted in a bore of the first plate, and by rotating of the spreading disc from the initial into the final rotational position, the clamping arms are spread radially outward against a wall of the bore of the first plate; and
    wherein a screw extends through a bore in the second plate and is screwed to the thread of the adjusting disc.

12. The assembly of claim 11, wherein the bore of the first plate is a blind bore.

13. The assembly of claim 11, wherein the first and the second plates are furniture plates.

* * * * *